(12) United States Patent
Meister

(10) Patent No.: US 6,401,550 B1
(45) Date of Patent: Jun. 11, 2002

(54) LIQUID METER WITH A SINGLE JET

(75) Inventor: Gilles Meister, Saint Louis (FR)

(73) Assignee: Societe Anonyme de Production de Procedes de Comptage de l'eau et Autres Liquides, Sappel, Saint Louis (FR)

( * ) Notice: Subject to any disclaimer, the term of this patent is extended or adjusted under 35 U.S.C. 154(b) by 0 days.

(21) Appl. No.: 09/496,594

(22) Filed: Feb. 2, 2000

(30) Foreign Application Priority Data

Feb. 2, 1999 (FR) .......................................... 99 01171

(51) Int. Cl.⁷ ................................................ G01F 1/06
(52) U.S. Cl. .................................. 73/861.79; 73/861.33
(58) Field of Search ........................ 73/861.39, 861.41, 73/861.351, 861.352, 861.79, 196, 197, 198, 861.45, 861.81

(56) References Cited

U.S. PATENT DOCUMENTS

| | | | | |
|---|---|---|---|---|
| 4,157,662 A | * | 6/1979 | Granberg | 73/233 |
| 4,561,312 A | * | 12/1985 | Roy | 73/861.81 |
| 4,630,488 A | * | 12/1986 | Marlier et al. | 73/861.81 |
| 5,341,686 A | * | 8/1994 | Chai | 73/861.33 |
| 5,965,826 A | * | 10/1999 | Von Bartrab | 73/861.87 |
| 6,079,281 A | * | 6/2000 | Oszajca et al. | 73/861.79 |

FOREIGN PATENT DOCUMENTS

| | | |
|---|---|---|
| DE | 77 206 | 1/1893 |
| DE | 41 606 | 6/1987 |
| DE | 197 19 400 | 11/1998 |
| EP | 0 408 443 | 1/1991 |
| EP | 0 520 306 | 12/1992 |
| FR | 2 566 898 | 1/1986 |
| GB | 00 746 | 4/1909 |

* cited by examiner

*Primary Examiner*—Benjamin R. Fuller
*Assistant Examiner*—Andre Allen
(74) *Attorney, Agent, or Firm*—Young & Thompson

(57) ABSTRACT

A liquid meter with a single jet of the type including a motor member transmitting its movement to a totalizer via a transmission mechanism constituted by an axle whose one end is secured in rotation to the motor member (1) and whose other end is engaged in a chamber, provided in a housing (2) enclosing a gear train and a drive axle of the totalizer, through an opening provided in the partition (6) of the housing (2), the end including a pinion coacting with a pinion mounted on the drive axle of the totalizer, and protective elements (10) for the axle (4). The protective elements are arranged to prevent the passage of solid particles contained in the liquid through the opening (5) toward the chamber (3) by defining a protected zone of least turbulence surrounding the axle (4) adjacent the opening (5) and promoting the fall by gravity of the particles which lose their initial kinetic energy during their movement toward the opening (5).

6 Claims, 3 Drawing Sheets

LIQUID METER WITH A SINGLE JET

FIELD OF THE INVENTION

The present invention relates to a liquid meter with a single jet, of the type comprising a motor member such as a turbine transmitting its movement to a totalizer by means of a transmission mechanism constituted by an axle whose one end is secured in rotation to the turbine and whose other end is engaged through an opening provided in the partition of a housing enclosing a gear train and a drive axle of the totalizer, said end comprising a pinion coacting with a pinion carried by the drive axle of the totalizer.

BACKGROUND OF THE INVENTION

Such a liquid meter comprising a motor member disposed on the axis of movement of the liquid stream to be measured, such as a turbine, is called a "single jet" because the liquid which passes through it and whose volume it measures, strikes this turbine with a single jet. As a result, the turbine is disposed in a region of passage of the liquid, called the measuring chamber, in which strong turbulence prevails because of the movement of the liquid jet and the agitation of the blades of said turbine, in particular the liquid having a rotating movement.

Conventionally, the totalizer actuates an indicator generally comprised by numerical drums, for demultiplication by a gear train.

The pinions of the gear train permitting transmission of the rotation of the turbine to the totalizer, are disposed in a housing and hence in a so-called immersed region, the liquid passing through the opening of the partition of the housing. The pinions are however isolated from the turbulence region of the measuring chamber by the partition of the housing and are accordingly in a region exempt from turbulence.

The liquid whose volume is measured can entrain solid particles. In the case of water, these solid particles can be abrasive, such as sand. The turbulence of the liquid in the turbine agitates the particles which are maintained in suspension in said liquid and it is noted that the turbulence is generally sufficiently strong to cause the entry of the solid particles into the chamber of the housing enclosing the transmission mechanism and in particular the pinions, the solid particles passing through the opening provided in the partition for the passage of the axle of the turbine, although this orifice is in a raised position above the turbine.

As a result, the solid particles move beyond the partition into the chamber containing the pinions and, as there is practically no longer any turbulence in this chamber, the solid particles settle. Because of this, the solid particles fall under the influence of gravity and come to rest particularly in the teeth of the pinions, which gives rise to deterioration of said pinions changing the transmission of the rotation of the turbine to the totalizer and as a result the precision of the meter.

From GB-A-746, there is known a water meter in which the water enters a chamber from one side so as to strike a section of the circumference of a turbine in one or two flows, which gives rise to a load on a single side of the turbine. The moving current causes rotary movement in the chamber and deflects the axis of turbulence toward the still water chamber. Also, so as to protect the axle of the turbine against the pressure of the flow of water and to space the flow from the center of the turbine, there has been proposed a semicircular partition at least in part surrounding the axle to deflect the water current so as to concentrate the flow only on the blades of the turbine. This partition can extend entirely about the axle of the turbine above and below the blades. Because of this, the lower partition, when it totally surrounds the axle, can constitute a receptacle for solid particles which are enclosed therein as in a trap and risk sooner or later blocking the turbine. Similarly, the space between the upper partition and the axle of the turbine is nowhere mentioned as being arranged to avoid an accumulation of solid particles. In particular, even if the solid particles were prevented from passing toward the pinion chamber, by the form described in this patent, the axle having an upper portion forming a retaining edge on which said particles could deposit, there would be an accumulation of said solid particles about said axle. Such a meter accordingly promotes the retention of solid particles.

SUMMARY OF THE INVENTION

The present invention therefore has for its object to provide a liquid meter with a single jet, in which the pinions of the transmission mechanism are protected against deterioration due to solid abrasive particles that can be contained in the measured liquid.

To this end, the present invention has for its object a liquid meter with a single jet, of the type comprising a motor member such as a turbine transmitting its movement to a totalizer by means of a transmission mechanism constituted by an axle whose one end is secured in rotation to the motor member and whose other end is engaged in the chamber provided in the housing enclosing a gear train, and a drive axle for the totalizer, through an opening provided in the partition of said housing, said end comprising a pinion coacting with a pinion mounted on the drive axle of the totalizer, comprising means for protecting said axle, characterized in that said protection means are arranged to prevent the passage of solid particles contained in the liquid through the opening provided in the partition of the housing toward the chamber enclosing the transmission mechanism, by defining a protected region of least turbulence surrounding said axle adjacent the opening (5) and promoting the falling back, under the influence of their gravity, of said particles, which lose their initial kinetic energy during their passage toward the opening of the partition.

Thus, preferably, the protection means permit avoiding the presence of solid particles in the immersed chamber of the housing enclosing the transmission mechanism, such that the latter is protected against deterioration, in particular from the deposit of these particles on the pinions, in particular at the level of the teeth, of the pinion chain of said transmission mechanism.

The life of the liquid meter with a single jet is thus prolonged by guaranteeing it moreover a greater reliability as to the precision of the measurements that are carried out.

Preferably, the totalizer is out of the water, which is to say that it is carried by the housing and separated from the latter by at least one partition. Preferably, the drive axle of said totalizer of the transmission mechanism drives in rotation an axle of the totalizer by magnetic transmission through the partition, said drive axle comprising, at its end opposite that carrying the pinion coacting with the pinion carried by the motor member axle, at least one magnet coupled to a magnet mounted on the axle of the totalizer.

Said means therefore define a region of least turbulence in the measuring chamber of the meter surrounding the axle of the transmission mechanism connected to the motor member and particles in said region are no longer subject to the influence of the turbulence of the liquid prevailing in the measuring chamber in which is disposed the turbine. The particles lose their initial kinetic energy even if the latter were relatively high so as to fall under the influence of gravity outside this region in the turbulence region in which they are carried by the liquid flow.

Preferably, said protection means are constituted by a cylindrical skirt arranged at the periphery of the opening of the partition of the housing, projecting toward the motor member, and entirely surrounding said axle so as to delimit the protected region of least turbulence substantially on the assembly of the length of said axle between the motor member and the partition of the housing.

Preferably, the internal surface of the skirt has at least one longitudinal radially projecting rib further promoting the braking of the rotative movement of the liquid within the skirt, which permits further decreasing the residual speed of the particles.

Preferably, the turbine acting as the motor member has a hub secured to the turbine at its upper portion fixed to the turbine and in which the axle is fixed in rotation, said hub extending from the turbine to the opening of the partition and having preferably a cross-section that enlarges from the opening of the partition toward the turbine, at least facing the skirt. This particular shape of the hub defines with the cylindrical skirt a region of least turbulence whose form promotes the fall of particles which thus do not encounter any retention place in said region. Preferably, the hub is of conical shape.

BRIEF DESCRIPTION OF THE DRAWINGS

There will now be described in greater detail an embodiment of the invention with reference to the accompanying drawings, in which.

DETAILED DESCRIPTION OF THE INVENTION

Figure 1:
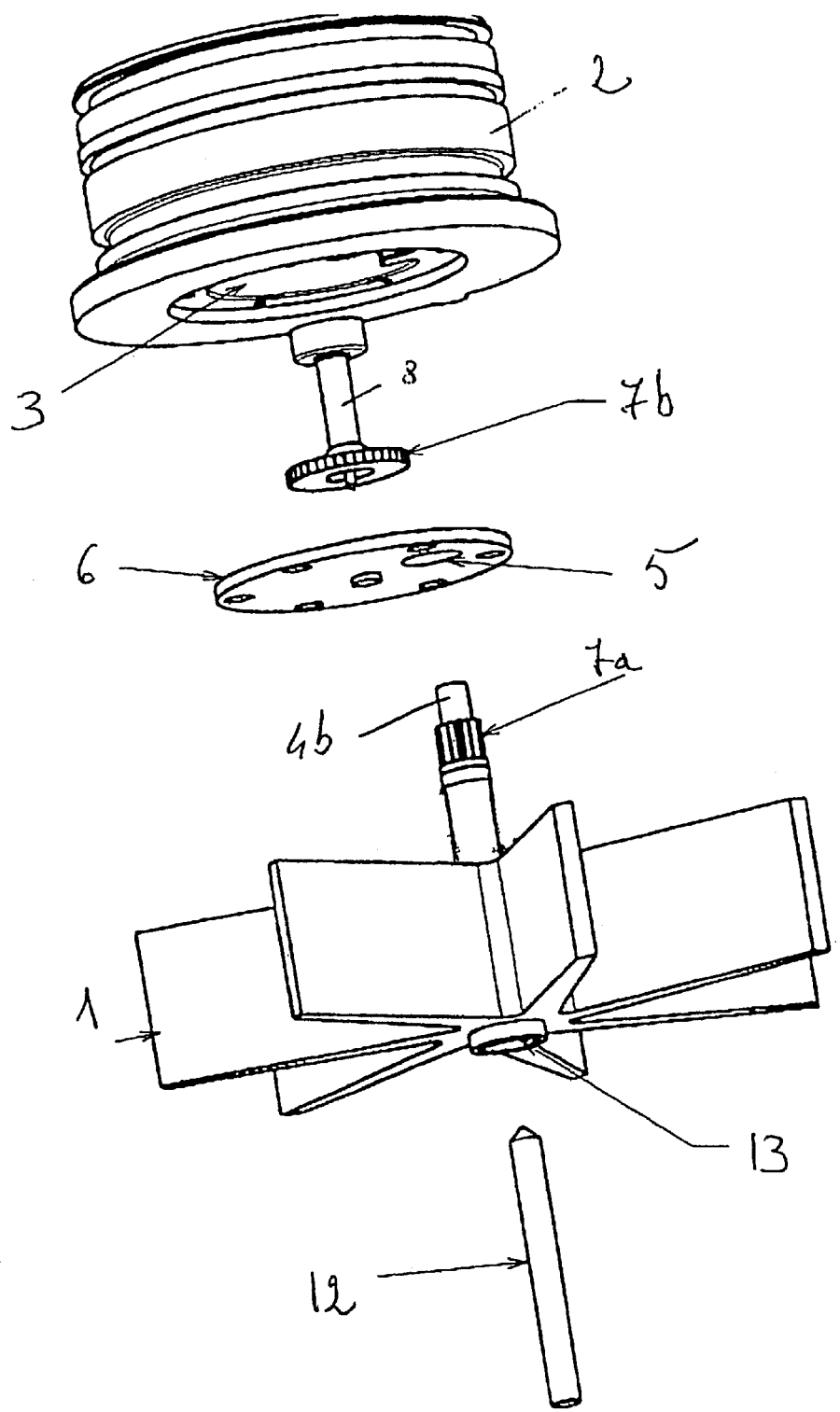
FIG. 1 is an exploded perspective view of a meter according to the prior art.

A liquid meter with a single jet according to the invention is similar to a liquid meter of the prior art shown in FIG. 1 and so the same reference numerals will be used for identical parts. Such a meter comprises a motor member such as a turbine 1 or a drive helix of a totalizer. The body (not shown) of the meter, preferably cylindrical with a circular cross-section, comprises a region for passage of the liquid to be measured in a so-called measurement chamber in which is disposed, along the axis of movement of the liquid, the turbine 1, a housing 2 being disposed in one of the walls of the body of the meter above the turbine 1 and carrying the totalizer T which is located outside the water (shown in broken lines in FIG. 4).

The turbine 1 is disposed in the path of a liquid such as water and is struck by the flow of water in a single jet to measure the volume of water flowing through the meter, and the totalizer T is disposed above the housing and hence above said turbine 1, the latter being guided in rotation by an axle 12 located in the lower portion of the body of the meter and engaged in a bore 13 of the turbine 1.

Figure 4:
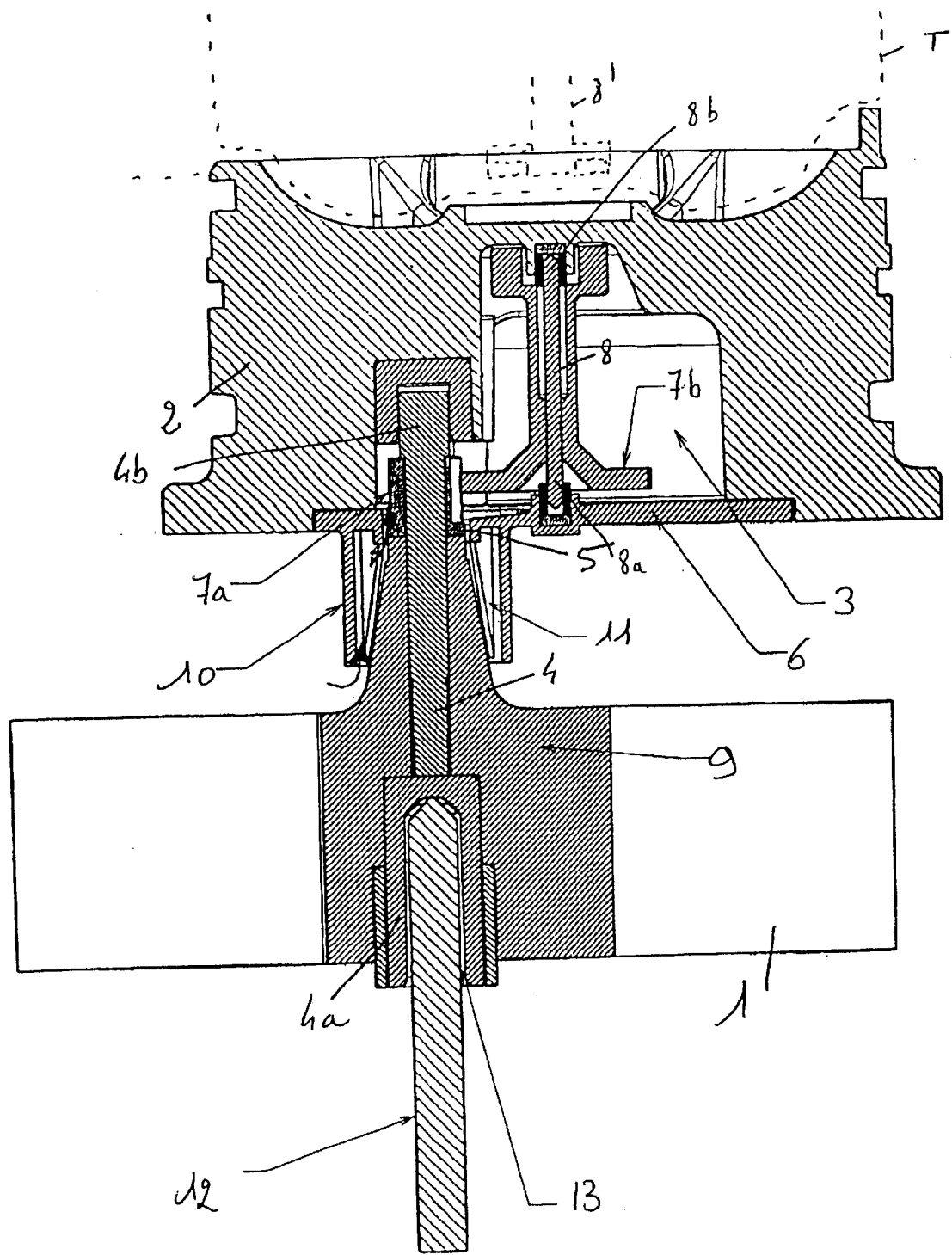
FIG. 4 is a cross-sectional view of the meter according to FIG. 2.

Under the influence of the water jet, the turbine 1 is driven in rotation and transmits its movement to the totalizer T by means of a transmission mechanism disposed at least in part in a chamber 3 of the housing 2. As is shown in FIG. 4, the totalizer T carried by the housing 2 and separated from the latter at least by the partition of said housing 2, is outside the water. This transmission mechanism comprises an axle 4 whose one end 4a is fixed in rotation to the turbine 1 and whose other end 4b is engaged, through an opening 5 provided in a partition 6 of the housing 2, in the chamber 3, with a gear train 7a, 7b and a drive axle 8 of the totalizer T. The axle 4 carries a pinion 7a of the gear train coacting with a pinion 7b of the gear train carried by one end 8a of the axle 8 for driving the totalizer T. The drive of the totalizer T is effected by magnetic transmission, said axle 8 carrying at least one magnet at its other end 8b, said magnet coacting with a magnet mounted on an axle 8' of the totalizer T so as to drive in rotation said axle 8' by magnetic coupling, through the partition of the housing 2, and to drive in rotation another gear train at the level of said totalizer T (the totalizer T being of a type known per se, it is not necessary to give it a more detailed description).

As can be seen in FIG. 1, showing a meter of the prior art, the water passing through the opening 5 also immerses the transmission mechanism disposed in the chamber 3. Because of this, solid particles such as sand contained in the water can also enter through said opening 5 into the chamber 3 enclosing the gear train 7a, 7b of the transmission mechanism and become lodged in the teeth of said pinions 7a, 7b.

Figure 2:
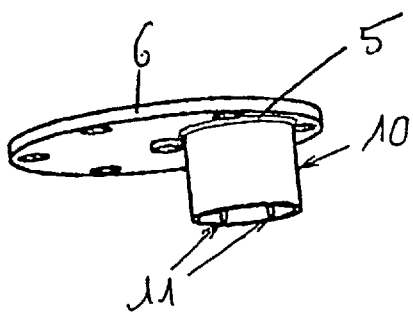
FIG. 2 is a perspective view of a meter according to the invention.
Figure 3:
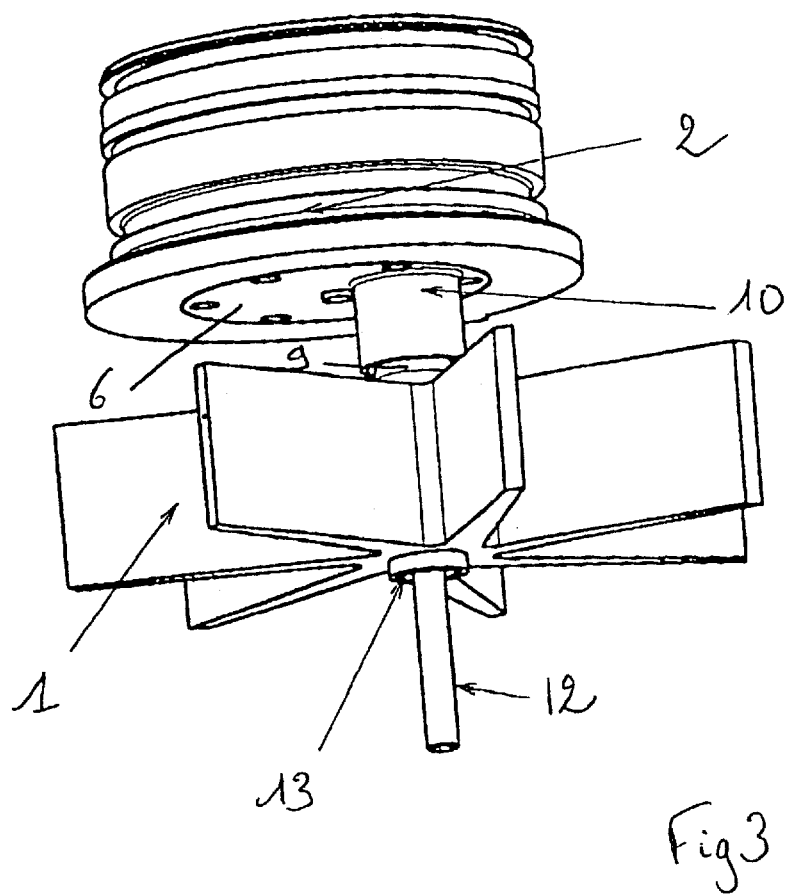
FIG. 3 is a perspective view of the partition of a meter according to FIG. 2.

The meter according to the invention shown in FIG. 2 comprises means for protecting against the entry of solid particles into the chamber 3. These means are constituted by a cylindrical skirt 10 extending projectingly at the periphery of the opening 5 of the partition 6 in the direction of the turbine 1 (see FIGS. 2 and 3) substantially over all the length of the axle between the partition 6 and the turbine 1 but not completely, which leaves a passage for water and hence for particles suspended in the water.

Preferably, the turbine 1 has a hub 9 secured to the turbine 1 at its upper portion and fixed in the turbine 1 and in which the axle 4 is fixed in rotation, so the hub 9 of conical shape extending preferably from its largest portion at the level of the turbine and narrowing toward the opening 5 of the partition 6.

This cylindrical skirt 10 therefore defines a space in which is disposed the turbine 1, also called the measuring chamber, a protected region of least turbulence about the axle 4 and more precisely about the hub 9 connected the turbine 1 to the housing 2.

Thus, the cylindrical skirt 10 forms a conduit defining this region of least turbulence about the hub 9, in which can flow the water containing suspended particles. The suspended particles, due to the strong turbulence existing in the measuring chamber because of the flow of water and the movement of the blades of the turbine 10, have a high kinetic energy. However, once in this conduit, the particles are no longer subjected to the turbulence.

Because of this, the particles lose their kinetic energy and fall under the influence of gravity outside said conduit along the hub 9, which facilitates their removal.

Preferably, the internal surface of the skirt 10 has radially projecting longitudinal ribs 11 permitting braking the rotative movement of the water within the conduit defined by the skirt 10 and hence reducing the residual speed of the particles. This skirt 10 can be made of a single piece with the partition 6.

What is claimed is:

1. A liquid meter comprising:

a housing having a chamber and an opening to said chamber;

a partition covering said opening, said partition having a downwardly facing hole;

a rotator adapted to be placed in a liquid to be metered, said rotator being carried by an axle that extends through said hole; and a skirt that depends from said partition and defines a protected region around said axle and said hole that is protected from turbulence in the liquid and in which particles in the liquid lose energy and fall under gravitational influence away from said hole, said skirt surrounding substantially all of said axle between said rotator and said partition while leaving an annular space between said rotator and said skirt to permit discharge of the falling particles.

2. The liquid meter of claim 1, further comprising a gear train inside said chamber and that is drivingly connected to said axle.

3. The liquid meter of claim 2, wherein said hole is offset from a center of said partition.

4. The liquid meter of claim 1, wherein a portion of said axle that is surrounded by said skirt is generally conical to further reduce turbulence in said protected region, said annular space between said rotator and said skirt being smaller than a further annular space between said skirt and said axle adjacent to said hole.

5. The liquid meter of claim 1, wherein said skirt is cylindrical.

6. The liquid meter of claim 1, further comprising longitudinally aligned ribs on an interior surface of said skirt that further reduce turbulence in said protected region.

* * * * *